United States Patent
Moeller et al.

(10) Patent No.: US 6,907,067 B1
(45) Date of Patent: Jun. 14, 2005

(54) METHOD AND TERMINAL EQUIPMENT FOR INTEGRATING AUDIOVISUAL CODED INFORMATION INTO A FRAME STRUCTURED TRANSMISSION STANDARD

(75) Inventors: Henning Moeller, Obernkirchen (DE); Peter Vogel, Hildesheim (DE); Jens Vollmer, Hannover (DE); Björn Soelch, Hildesheim (DE); Sven Bauer, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/786,574
(22) PCT Filed: Sep. 1, 1999
(86) PCT No.: PCT/DE99/02770
 § 371 (c)(1),
 (2), (4) Date: Sep. 24, 2001
(87) PCT Pub. No.: WO00/14966
 PCT Pub. Date: Mar. 16, 2000

(30) Foreign Application Priority Data

Sep. 7, 1998 (DE) .......................................... 198 40 500
Oct. 1, 1998 (DE) .......................................... 198 45 193

(51) Int. Cl.⁷ ............................ H04N 7/12; H04L 12/28
(52) U.S. Cl. .............................. 375/240.01; 370/395.64; 348/423.1
(58) Field of Search .............................. 375/240, 240.01, 375/240.1, 240.24; 370/395.5, 395.64; 348/384.1, 395.1, 397.1, 403.1, 423.1; 704/500, 501; 379/93.21, 202.01

(56) References Cited

U.S. PATENT DOCUMENTS

| 6,079,566 | A | * | 6/2000 | Eleftheriadis et al. | ...... 707/101 |
| 6,092,107 | A | * | 7/2000 | Eleftheriadis et al. | ...... 709/217 |
| 6,584,077 | B1 | * | 6/2003 | Polomski | ...................... 370/263 |
| 2002/0097798 | A1 | * | 7/2002 | Manor | .................... 375/240.02 |

FOREIGN PATENT DOCUMENTS

| EP | 0 905 976 | 3/1999 |
| GB | 2 318 030 | 4/1998 |
| WO | WO 98 21846 | 5/1998 |

OTHER PUBLICATIONS

Jose M.F. Moura et al: "Video Over Wireless", 8439 IEEE 3 (1996), pp-44–54.
D. Lindbergh, *The H. 324 Multimedia Communication Standard*, IEEE Communications Magazine, US, vol. 34, no. 12, Dec. 1, 1996, pp. 46–51.
*Information Technology—Generic Coding of Audio–Visual Objects Part 1: Systems, ISO/IEC 14496–1 Final Committe Draft of International Standard*, May 18, 1998.
Watanabe et al., *MPEG 4 Technology For Mobile Multimedia Communications*, Toshiba Review, Tokyo, Japan, vol. 53, No. 4, 1998, pp. 41–44.

* cited by examiner

*Primary Examiner*—Benny Tieu
(74) *Attorney, Agent, or Firm*—Kenyon & Kenyon

(57) ABSTRACT

To integrate audiovisual, encoded information into one predefined, frame-structured transmission standard, individual data streams are multiplexed into one or a plurality of data channels of the frame-structured transmission standard. In addition, the capabilities of the communicating terminals are exchanged.

24 Claims, 7 Drawing Sheets

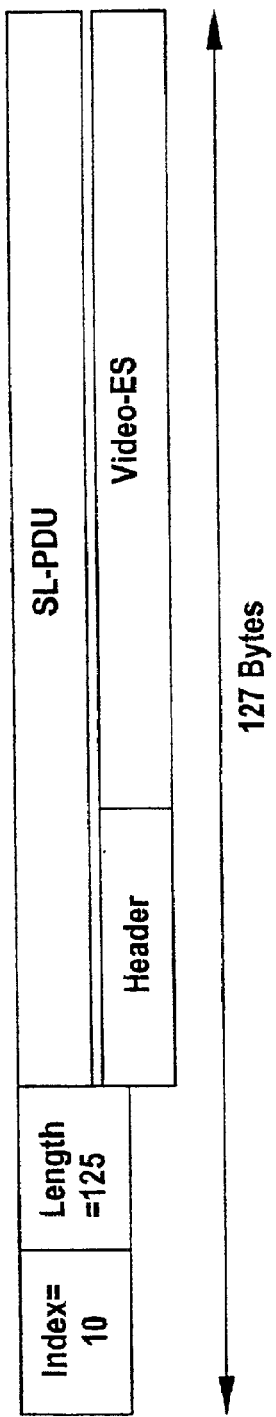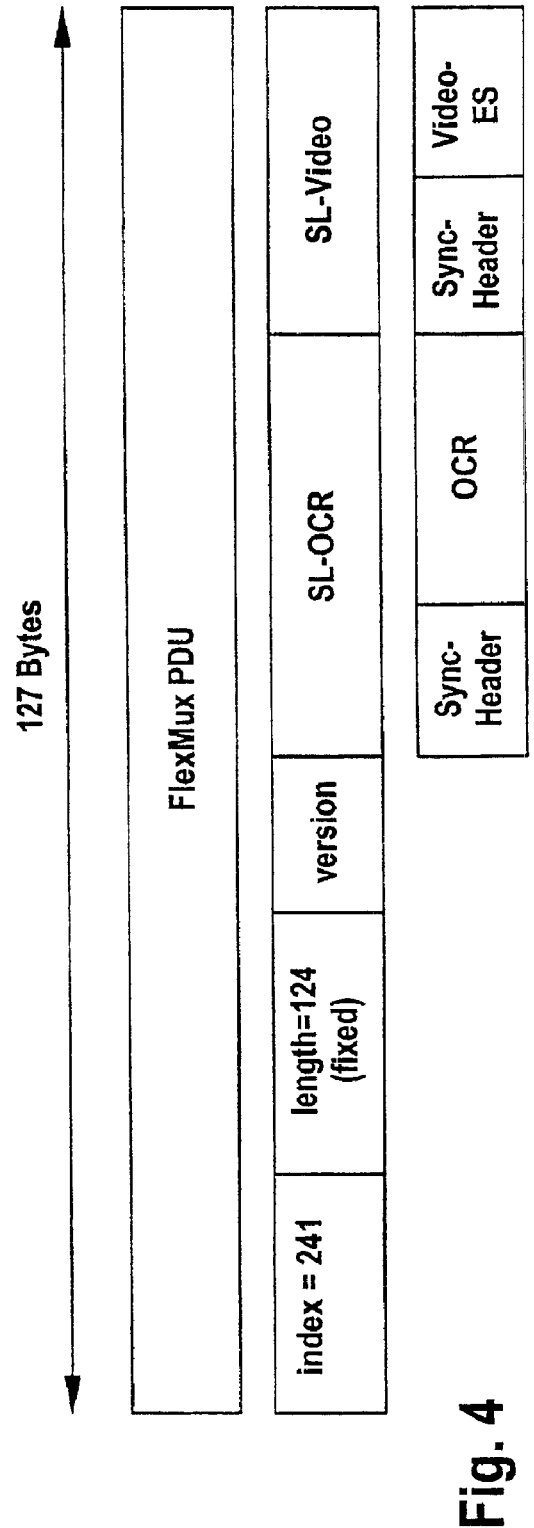
Fig. 3
Fig. 4

MC: Multiplex Code [5 4 3 2]
HEC: Header Error Control [8 7 6]
PM: Packet Marker [1]

| MultiplexEntry Descriptor | Element ListSize | Nesting Depth | Subelement ListSize | Example |
|---|---|---|---|---|
| {LCN0,RC21}, {LCN1,RC UCF} | 2 | 0 | 0 | Control, all MPEG 4 |

METHOD AND TERMINAL EQUIPMENT FOR INTEGRATING AUDIOVISUAL CODED INFORMATION INTO A FRAME STRUCTURED TRANSMISSION STANDARD

FIELD OF THE INVENTION

For the transmission of image and sound data at low bitrates for multimedia communications, on the basis of the ITU-H.324 specification, "Terminals for Low-Bitrate Multimedia Communications," a system is specified which is suited for video telephony applications.

BACKGROUND INFORMATION

FIG. 1 depicts a block diagram of a multimedia system according to the H.324 standard. In the block designated by reference numeral 1 are accommodated the modules which are defined in greater detail in H.324. Video codec 2 is configured in accordance with the method in ITU-H.263/H.261. In order to smooth out any time differences between the image coding and the sound coding, a delay device 4 is connected downstream of audio codec 3 in accordance with ITU G.723. Device 5 functions to process data protocols, e.g., V.14 LAPM, etc., and device 6 processes control protocols in accordance with ITU H.245. The audiovisual data is supplied to codecs 2 and 3 by appropriate I/O (Input/Output) devices 7 and 8. The devices for processing protocols 5 and 6 receive their input data via devices 9 (User Data Applications) and 10 (System Control). The data streams of codecs 2, 3 and of protocol processing devices 5 and 6 are joined via multiplex/demultiplex device 11 in accordance with the H.223 standard. Modem 12, connected downstream, supplies V.34 conformal data for the combined data streams and V.25 conformal data for the system control data. Transmission network 13 is connected to block 1, along with an appropriate network control system 14.

SUMMARY OF THE INVENTION

The method in accordance with the present invention is suitable for integrating information that is encoded in an object-based manner, in particular according to the MPEG-4 transmission standard, into one predefined, frame-structured transmission standard, in particular into an ITU standard, and it thus makes possible the transfer of the encoded MPEG-4 data. In contrast to conventional video coding methods, such as the video method discussed above in accordance with ITU-H.263/H.261 and the audio codec according to G.723. 1, the following specific advantages result:

object-based coding of synthetic and natural visual objects as well as audio objects,
improved coding efficiency,
improved visual error-resistance of the video coding,
individualized format for describing the arrangement of audiovisual objects,
synchronization of different audiovisual objects,
interaction with audiovisual objects.

PCT Publication No. WO 98/21846A describes multiplexing a multiplicity of substantially identical audiovisual data streams into one common intermediate data stream. For the intermediate data streams, measures are devised for detecting errors via an appropriate signaling in an initialization phase. The intermediate data streams are grouped into one overall data stream.

The publication by Lindbergh D., entitled "The H.324 Multimedia Communication Standard," IEE Communications Magazine, US, ISS Service Center, Piscataway, N.J., Vol. 34, No. 12, Dec. 1, 1996 (Dec. 1, 1996), pages 46–51, describes joining data streams. By exploiting data packets of a constant length in the frame structure, the error-resistance is increased. Synchronization to the data stream after an error is possible in a simple manner. An encapsulation or even the joining of different systems can be carried out in a simple manner.

The publication Information Technology—Generic Coding of Audiovisual Objects Part 1: System (Passage) ISO/IEC 14496-1, Final Committee Draft of International Standard, May 18, 1998, describes a similar signal joining is known.

The method according to the present invention is based on two different concepts—designated below as Concept A and B. In general, each of the concepts is suitable by itself alone to secure the desired functionality—transmission of object-based coded audiovisual information—, but Concept A can be advantageous with regard to larger numbers of objects (i.e., a large number of MPEG-4 data streams). A combination of the two concepts is also possible.

Therefore, the method according to the present invention has the great advantage that all MPEG-4 data streams—for example, when a large number of objects are used—can be packetized using the MPEG-4 FlexMux specification, into one data stream, which contains all of the information for decoding (Concept A), and/or a bi-directional communication can be carried out based on the total of MPEG-4 functionalities, without requiring expensive additional adjustments of the MPEG-4 data to the formats of the communications standard. This is made possible through the consistent exploitation of the mechanisms made available by the multimedia communications H.324 standard (Concept B).

Furthermore, in the exchange of capabilities and in the opening of a transmission channel, the same data structures are used which designate the type of data stream to be transmitted, the coding tools used, and their parameters, such as the data capacity.

Through the application of data packets of a constant length (in Concept A) or through the exploitation of the frame structure of the multiplex H.223 standard embedded in H.324 (in Concept B), error-resistance is increased. Synchronization to the data stream after an error is possible in a simple manner. An encapsulation or even the joining of different systems, e.g., a combination of an H.324 platform and an MPEG-4 platform, can be carried out in a simple manner.

BRIEF DESCRIPTION OF THE DRAWINGS

FIG. 3 depicts the setup of a Flex-Mux protocol in simple mode having a constant length.

FIG. 4 depicts the setup of a Flex-Mux protocol in Mux mode having a constant length.

DETAILED DESCRIPTION

Figure 1:
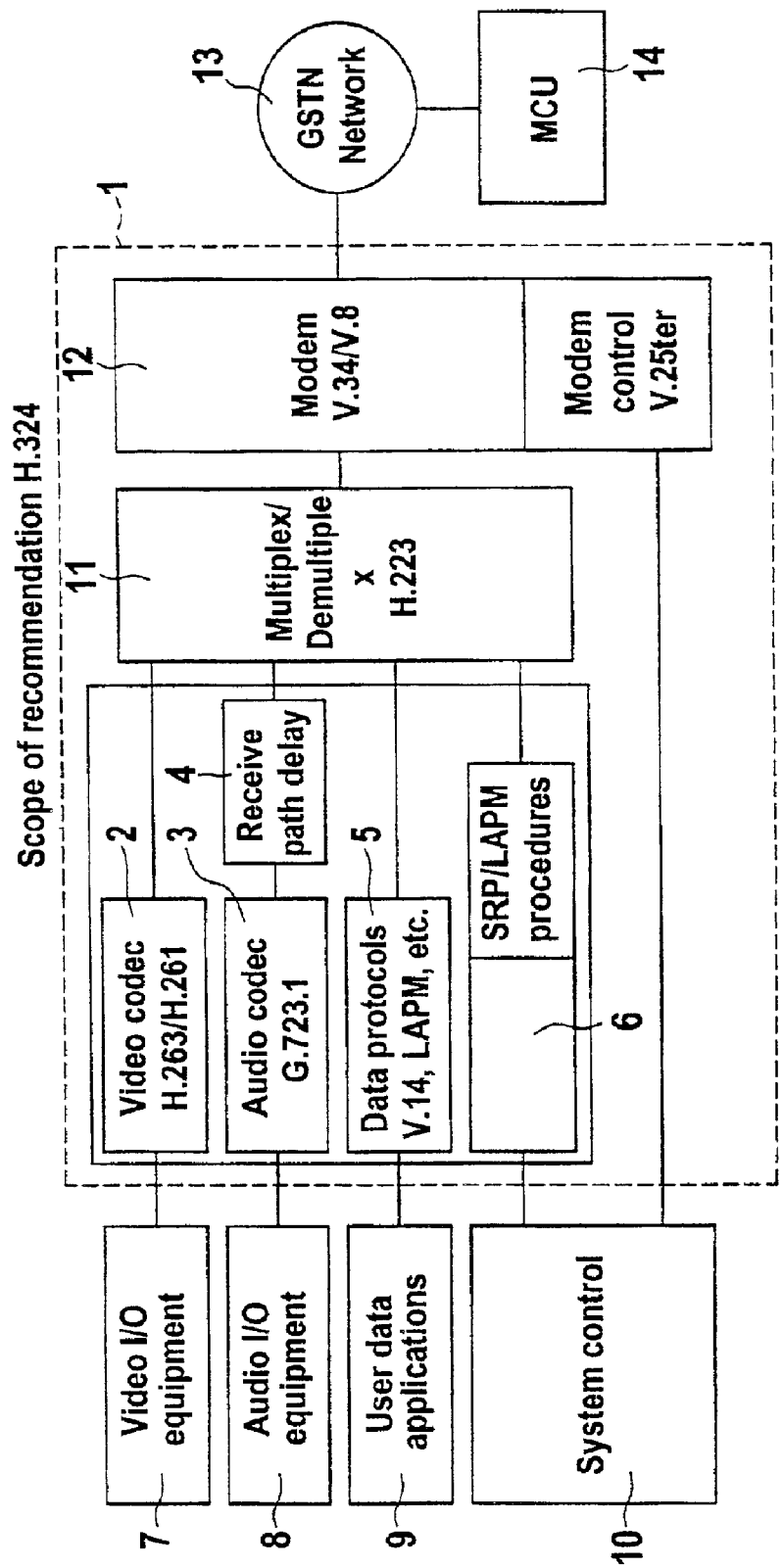
FIG. 1 depicts a block diagram of a multimedia system according to the H.324 standard.

Before the method according to the present invention is described in detail, for the sake of greater intelligibility, the standards used will be briefly specified:

The ITU-H.324 standard specifies a terminal which is composed of a video codec in accordance with H.261/H.263, an audio codec in accordance with G.723, a multiplexer in accordance with H.223, and a control protocol in accordance with H.245. The setup and the assembly of the individual components is described in this standard.

The ITU-H.223 standard specifies a packet-oriented multiplex protocol for multimedia communications at low bitrates. It is used for the transmission of low bitrates between two multimedia terminals or between one terminal and a multipoint unit. The protocol makes possible the transmission of any combination of audio, video, and data information via one individual communications channel. The protocol is characterized by "low-delay" and low overhead. The protocol procedures for implementing the multiplex protocol are specified in the H.245 standard.

The ITU-H. 245 standard, "Control Protocol for Multimedia Communication," specifies the syntax and the semantics of terminal information and messages as well as the procedures for the communications setup. The messages make possible the exchange of terminal capacities/capabilities, e.g., terminal A signals to terminal B that it can decode video data and which methods it supports.

Furthermore, a protocol is specified, permitting the reliable transmission of audiovisual data via an Acknowledge Message (terminal A signals to terminal B the correct reception of the data packet).

The ITU-H.263/H.261 specifies the coding of compressed video data for channels at low bitrates.

The G.723.1 standard specifies the decoding of compressed audio data for channels of low bitrates.

For the transmission of MPEG-4 data using the H.245 standard, the following steps are required:

1. First, a capability exchange of the communicating terminals takes place in order to make possible reciprocal communication. The data transmission takes place in logical channel 0, corresponding to H.245, provided for this purpose.
2. Next, the MPEG-4 decoders are configured. The specific MPEG-4 information required for this purpose, such as the Initial Object Descriptor, is transmitted either via H.245, in particular logical channel 0, or via a separate logical ITU channel, in particular a logic channel not equal to 0, in accordance with the ITU-H.223 standard.
3. Then, using the H.245 standard, the individual logical channels are opened for transmitting the audiovisual data streams.

Regarding 1: Capability Exchange

For the capability exchange, it is sufficient to define an MPEG-4 capability within H.245, which can look as follows:

```
Is14496Capability
{
   streamType          INTEGER (0 . . . 255)
   ProfileIndication   INTEGER (0 . . . 255)
   LevelIndication     INTEGER (0 . . . 255)
}
or
Is14496Capability
{
   streamType          INTEGER (0 . . . 255)
   DecoderSpecificInfo OCTET STRING OPTIONAL
}
or
Is14496Capability
{
   decConfDescr        DecoderConfigDescriptor
}
```

The individual fields of the above data structures are discussed in greater detail in the MPEG-4 documents (ISO/EEC 14496). The advantage of this Capability Definition is based on the low data overhead and a reference to the specification within the MPEG-4 standard, therefore avoiding an overhead in additional definitions in the H.245 standard. The streamType defines the type (i.e., the content) of the data stream, the Profile Indicator defines the decoder tools, and the level defines the parameters of these decoder tools. Among other things, these parameters are contained within MPEG-4, with the exception of the Level Indication, which has yet to be specified by MPEG.

In Concept B, using the "data type" field when a logical channel is opened using the H.245 function, OpenLogicalChannel, the is14496Capability also functions to indicate the MPEG-4 data type transmitted in this channel.

Regarding 2: Configuration of the Decoders

After the terminal capabilities have been defined using the Capability Exchange, the configuration of the decoders is carried out through the transmission of the Initial Object Descriptors or of the Object Descriptors. This takes place either using a request/confirm command in accordance with H.245, within which the Initial Object Descriptors are exchanged, or by opening a new logical ITU channel, which only contains the Initial Object Descriptor or the SL-packetized Object Descriptor stream.

Regarding 3: Opening the Logical Channels and Data Transmission

Figure 2A:
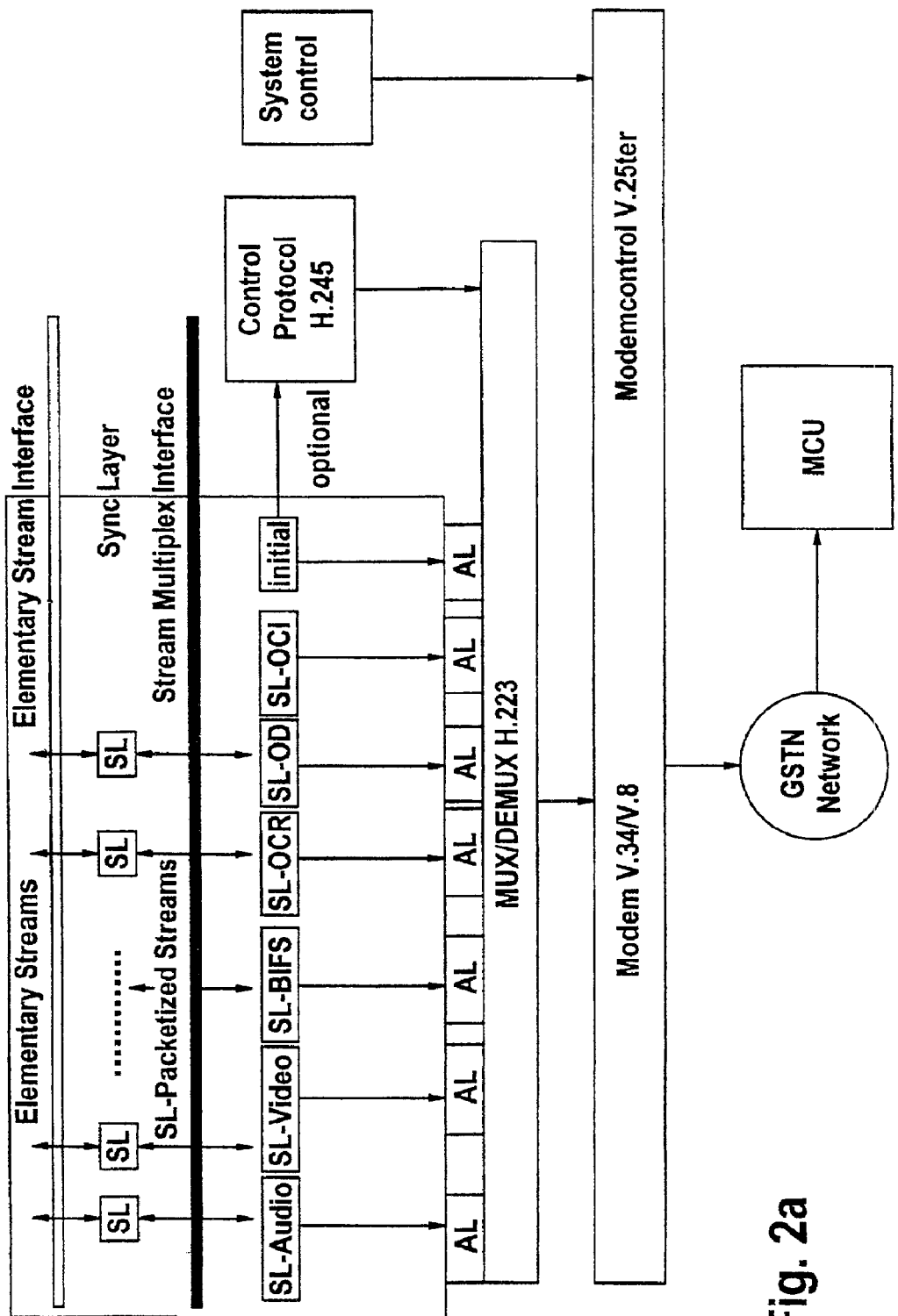
FIG. 2a depicts a first block diagram of MPEG-4 multimedia systems based on an H.324 terminal.
Figure 2B:
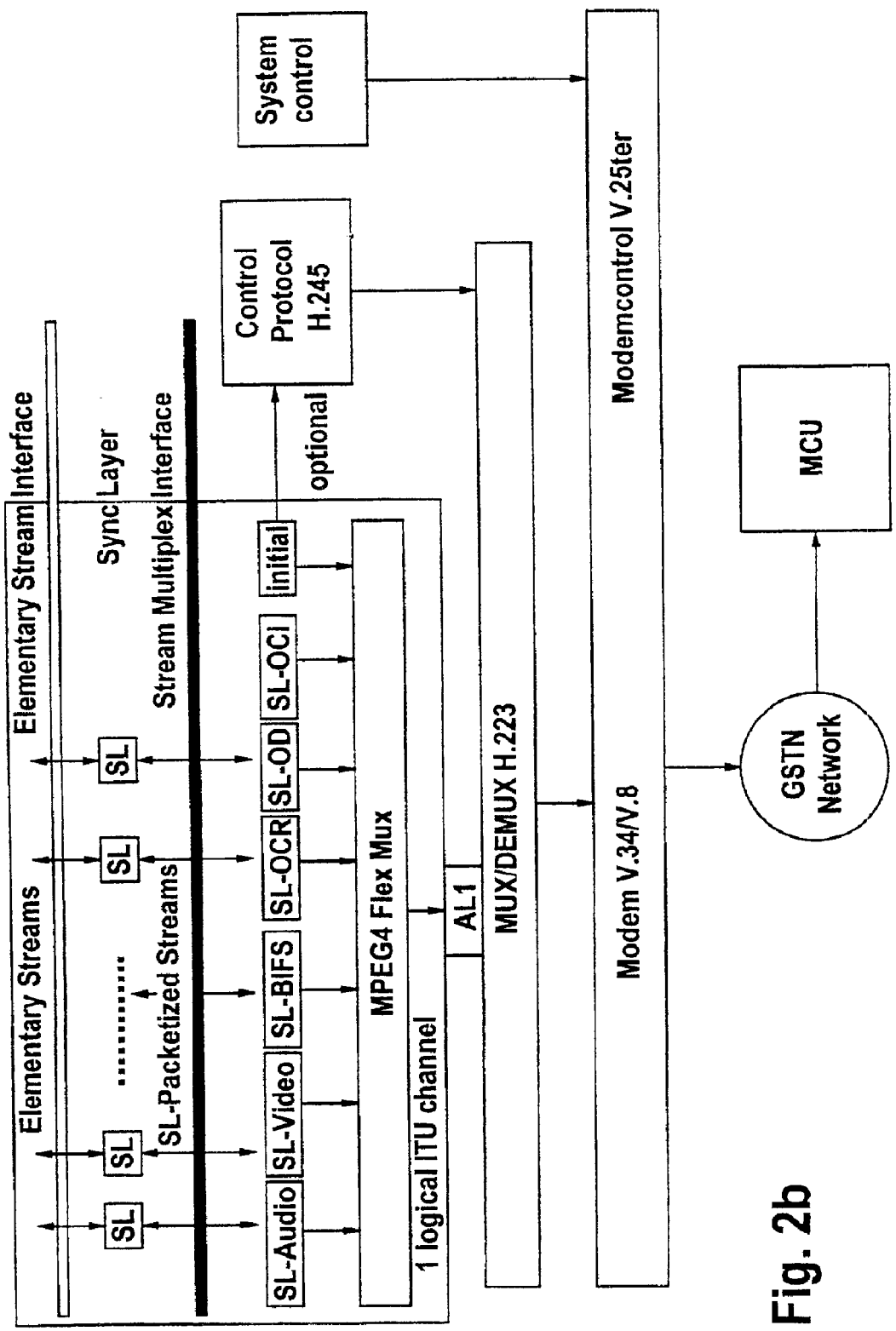
FIG. 2b depicts a second block diagram of MPEG-4 multimedia systems based on an H.324 terminal.

After the configuration, the individual ITU channels are opened. In general, the following applies:

The audiovisual coded information, in particular in accordance with MPEG-4, is processed in separate data streams. An encoder, which generates an MPEG-4 conformal data stream, already delivers at its output a plurality of these separate data streams, in particular SL (Synchronization Layer)-packetized data streams. In FIG. 2*a* and FIG. 2*b*, the elementary data streams (El. Streams) are depicted at the "Elementary Stream Interface" of the Sync (synchronization) layer. In this regard, it should be noted that the header of the SL packets can also be configured at "zero"— i.e., omitted. Within this "Sync Layer," the packetizing of the elementary data streams takes place, which then can be picked off at the "Stream Multiplex Interface" for further processing.

According to Concept B, opening a logical channel takes place using the OpenLogicalChannel Message defined in H.245. In opening the specific logical channel, the "portNumber" field functions for the signaling of the assigned elementary data stream identification (ES_ID), using which the data streams are referenced on the MPEG-4 side. Using the "streamType" field, to which is assigned here the value of an Is14496Capability (thus the same data structures can be used as in the case of the Capability Exchange), in this context, the content of a logical channel (i.e., the MPEG-4 object type) is explicitly indicated in each case. In the actual—then subsequent—data transmission, in Concept B, each individual SL-packetized MPEG-4 data stream is picked off at the "Stream Multiplex Interface" and is transmitted in a logical ITU channel. For this purpose, the SL-packetized MPEG-4 data streams are further processed by the H.233 AdaptationLayer as AL-SDU packets and are multiplexed using the H.223 standard (exemplary embodiment according to FIG. 2a). This acceptance of the MPEG-4 framing of the data into a framing in accordance with H.223 (SL-PDU:=AL-SDU) increases the error-resistance and makes possible a simple resynchronization in the event that a packet was transmitted in an erroneous fashion. In addition, as a result, an otherwise additional adaptation of the MPEG-4 data format to the format of the multiplexer is avoided. Concept B makes possible the (later) dynamic adding of further MPEG-4 data streams.

For the conversion of Concept A, individual data streams are multiplexed into a total of only one data stream using the MPEG-4 FlexMux and are transmitted in a total of one logical ITU channel (exemplary embodiment in accordance with FIG. 2b). For this type of transmission of MPEG-4 data streams using the FlexMux, additional Descriptors are defined, which make possible the connection setup. Only using these Descriptors is the recognition of the individual MPEG-4 data streams possible. These MPEG-4specific data streams are multiplexed using the MPEG-4 FlexMux tools. In this context, the use of packets of a constant length is defined, as a result of which the error-resistance is increased. In this manner, synchronization to the data stream after an error is possible.

Below, Concept A is described in detail.

As FIG. 2b shows, the following logical MPEG-4 objects (SL-packetized data streams) can be multiplexed using the MPEG-4 FlexMux tools into one transmission frame and can be transmitted in one logical ITU channel AL1:
SL-audio,
SL-video,
SL-OCR (Object Clock Reference),
SL-OD (Object Descriptor),
SL-OCI (Object Content Information).

In one easy transformation of Concept A, it is also possible to multiplex data exclusively of the same type (e.g., either only SL-audio or only SL-video) into one logical channel using the FlexMux tools, i.e., to transmit the entirety of the MPEG-4 data streams in a plurality (although less than in Concept B) of logical ITU channels. Under certain circumstances, this would make possible a simpler separation and decoding of the multiplexed data in the receiver. However, the original Concept A, i.e., the multiplexing of all MPEG data streams into one logical ITU channel using the FlexMux tools is considered below.

Concept A (just as Concept B) makes possible the transmission of a plurality of MPEG-4 data streams of the same type, such as the transmission of a plurality of audio streams for an image-accompanying sound in different languages.

For the method in accordance with Concept A, MUXCODETABLE_Entry is transmitted during the initialization phase in order to configure the MPEG-4 FlexMux.

In the end, the stipulated assignment of the individual ES streams to the data to be multiplexed is communicated to the MPEG-4 decoder. This is achieved using a Channel Map Table (also known as Stream Map Table).

In addition to the Object Descriptors, these two information messages are used for the decoding.

In order to insert the additional information messages MUXCODETABLE_Entry and Channel Map Table into the Initial Object Descriptor, the definition of the new Descriptors is used. The latter are inserted in the form of Extension Descriptors into the Initial Object Descriptor.

```
Class Channel Map Table Descriptor: bit (8) tag = to be defined
{
  bit(16) length:
  bit (15) streamCount:
  bit (1) MultiplexCodeFlag;
  For (i=0; i<streamCount; i++{
    bit (16) ES_ID;
    bit (8) FlexMuxChannel;
    IFMultiplexCodeFlag {
      bit (4) MultiplexCode;
      bit (4) reserved;
    }
  }
}
```

The part printed in bold indicates the Descriptor that is newly defined here.

Similarly, the setup of a MuxCodeTableEntryDescriptor can be carried out:

```
Class MuxCodeTableEntryDescriptor: bit (8) tag = to be defined
{
  bit (16) length
  bit (4) number of MuxCodeTableEntries;
  bit (1) constantLengthFlag;
  bit (3) reserved;
  IF constantLengthFlag
    bit(8) FlexMuxLength;
  For (j=0; j<numberOfMuxCodeTableEntries; j++ {
    bit (8) length;
    bit (4) MuxCode;
    bit (4) version;
    bit (8) substructureCount;
    for (I=0; i<substructureCount; I++) (
      bit (5) slotCount;
      bit (3) repetitionCount;
      for (k=0; k<slotCount; k++) (
        bit (8) FlexMuxChannel (I) (k);
        bit (8) numberOfBytes (I) (k);
      }
    }
  }
}
```

The part printed in bold indicates the Descriptor newly defined here. The data field numberOfMuxCodeTableEntries makes it possible to transmit the maximum of 16 MuxCodeTableEntries. Using the constantLengthFlag and the field FlexMuxLength, it is signaled to the receiver that the FlexMux packets having a constant length are transmitted in the packet size FlexMuxLength +2.

The FlexMux packets defined in MPEG-4 are transmitted, on the one hand, in the simple mode in accordance with FIG. 3 and, on the other hand, in the MuxCode in accordance with FIG. 4.

By using packets of a constant, nonlinear length, here 127 bytes, the upper 7 bits of the Length field can be used for synchronization.

This increases the error-resistance and makes possible a resynchronization in the event that a Length field of one packet is faulty.

Figure 5:
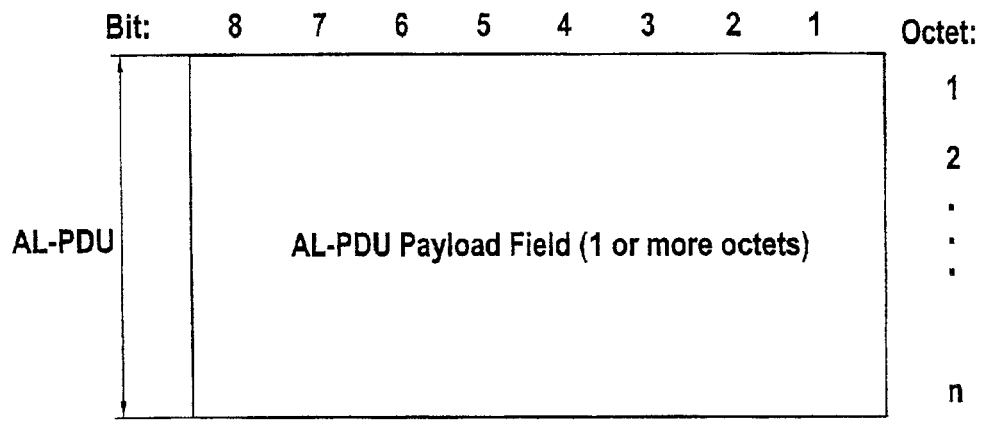
FIG. 5 depicts an Adaptation Layer Frame in accordance with ITU H.223.

These FlexMux packets are now merged into one ITU frame. In FIG. 5, an Adaptation Layer (AL) frame in accordance with ITU-H.223 is depicted, having an AL-PDU (Protocol Data Unit) Payload Field. Due to the variable length of a FlexMux packet, it would no longer be possible to locate a new FlexMux packet after an error in the length field. This is particularly injurious if a plurality of MPEG-4 elementary streams (e.g., BIFS, OD, and video) are transmitted in one ITU channel.

By using constant lengths within the MPEG-4 FlexMux packets, according to the present invention this is now possible.

By using a constant length within the MPEG-4 FlexMux packet, this is now possible according to the present invention.

The individual AL-PDU packets of variable lengths are now packetized using the multiplexer.

The setup of the Multiplexed Layer and the basic integrating of the MPEG-4 FlexMux data stream are briefly discussed.

Figure 6:
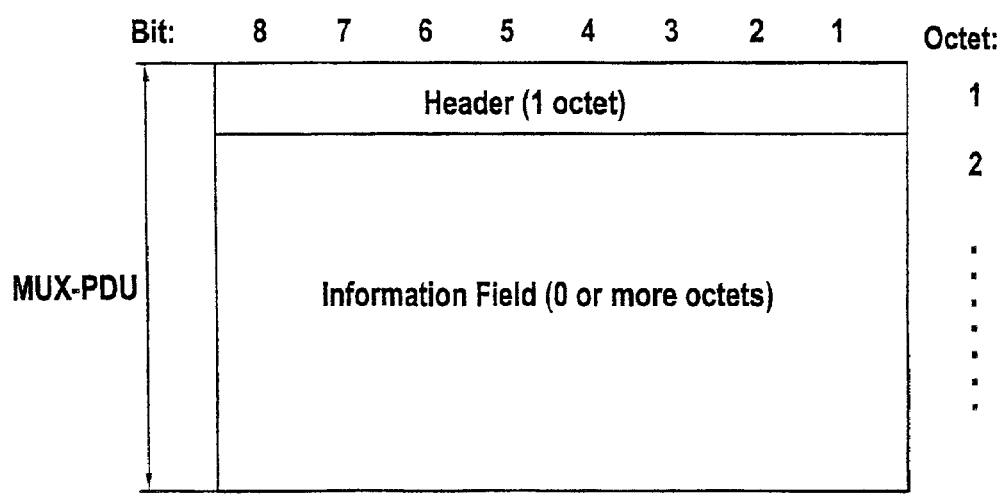
FIG. 6 depicts the nesting of the data of the logical ITU channels.

A MUX Protocol Data Unit (MUX-PDU) is composed of a header and an information field, in nesting the data of the individual logical ITU channels. FIG. 6 depicts the setup.

The header is composed of individual fields, which are shown in FIG. 1.

The 4bit-large Multiplex Code indicates a MultiplexEntry transmitted over H.245, of which a maximum of 15 different ones can be defined.

The header Error Control Field is a 3-bit-large CRC Field, which permits error detection in the header.

The 1-bit packet Marker Field marks the end of a MUX-SDU of a segmented logical channel.

The information field shown in FIG. 6 is configured using the MultiplexTable transmitted in H.245.

The information field can at any time be closed at an Octet Border using a Closing Flag, but a MUX-SDU may not be interrupted by a non-segmentable channel.

Figures 7, 8:
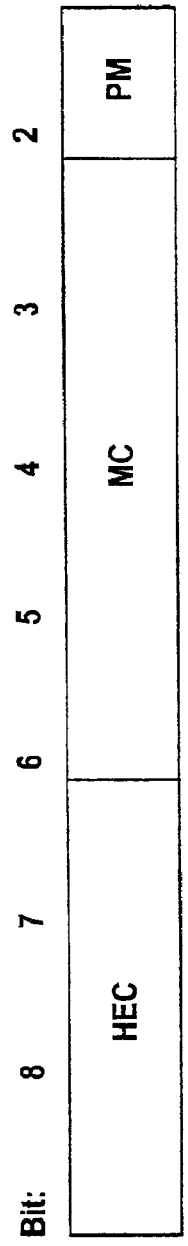
FIG. 7 depicts the header format.
FIG. 8 depicts an example for a Multiplex Entry Descriptor.

The MultiplexEntryDescriptor configures the H.223 Multiplexer and is transmitted in the initialization phase (FIG. 8).

In this Figure, LCN denotes: LogicalChannelNumber, RC: RepeatCount; UCF: UntilClosingFlag.

Figure 9:
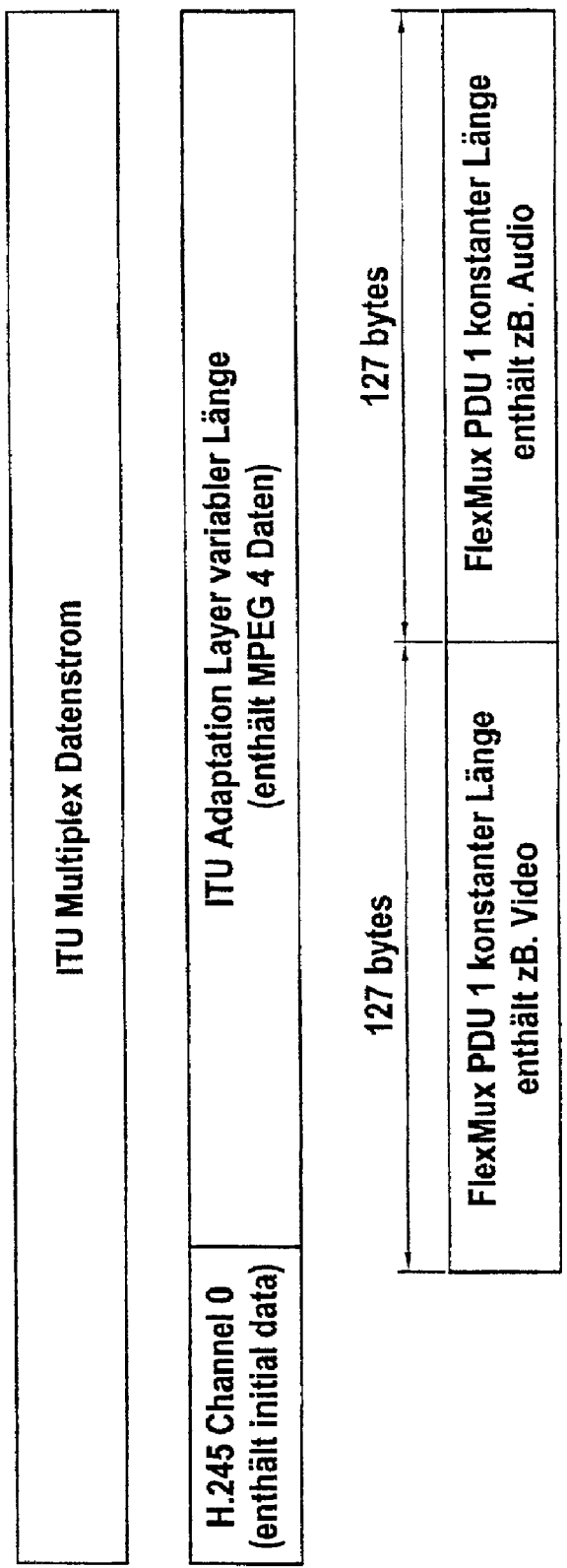
FIG. 9 depicts the integrating of packets of a constant length into the flu Adaptation Layer of variable length.

The advantage is made clear in FIG. 9:

if, in an ITU channel, a plurality of MPEG data are transmitted and MPEG-4 packets of variable length are used, then none of the following FlexMuxPackets can any longer be decoded. The skillful use of the Length field as a synchronization marker makes possible the synchronization of the receiver.

The transmitting terminal signals the packet length to the receiving terminal using the MuxCodeTableEntryDescriptor defined here, which is designated by a flag, which signals the use of FlexMux packets of a constant length and which also contains a field that establishes the length to be used. In this manner, high flexibility, in conjunction with great error-resistance, is assured.

Of course, the present invention does not have to be used only for MPEG-4 data, but may also be used for other audiovisual coded information which is to be merged into one standardized transmission frame and whose decoding is to take place mi a manner that is simple and resistant to errors.

Of course, the method presented can be realized in transmitter-side and receiver-side terminals. For transmitter-side integrating, the appropriate element is provided for preparing, or for delivering, audiovisual coded information, as well as an appropriate element for multiplexing the data streams, exchanging the capabilities, and signaling. For the receiver-side evaluation, what is desirable is a way for decomposing up the multiplexed data channels as well as means for exchanging capabilities and their valuation, as well as for evaluating the signaling. Since usually work is done in the interactive mode, subscriber terminals are furnished both for transmitting as well as for receiving operation.

What is claimed is:

1. A method for integrating audiovisual encoded information into a predefined frame-structured transmission standard, comprising the following steps of:

preprocessing the audiovisual encoded information into separate data streams, respectively supplying in the audiovisal encoded information into separate data streams;

multiplexing the separate data streams into at least one data channel in the predefined frame-structured transmission standard;

exchanging capabilities of terminals that communicate with another as to type is of data capable of being one of encoded and decoded and as to encoding and decoding operations that are supported, after a connection is established; and signaling, in accordance with data structures of an encoding standard, specifications on data type used, a decoding tool to be used, and the encoding parameters including a data capacity.

2. The method as recited in claim 1, wherein:

the data structures are selected so as to be identical.

3. The method according to claim 1, further comprising the steps of:

for object-based, audiovisually encoded information having a low number of objects, causing a multiplexer to packetize a set of the separate data streams; and transmitting the packetized set of separate data streams in individual transmission channels in accordance with the H.245 standard.

4. The method according to claim 3, wherein:

the multiplexer conforms to the H.223 standard, and the individual transmission channels include ITU channels.

5. The method according to claim 3, wherein:

a data field assigns individual packets within the individual transmission channels assigned to the individual packets, and a data field in an MPEG-4 transmission contains an identification of individual elementary data streams.

6. The method according to claim 3, further comprising the step of:

taking over directly from the multiplexing step a data format of MPEG-4 output data streams in order to avoid a further reformatting.

7. The method according to claim 3, further comprising the step of:

accommodating object descriptors for the audiovisual encoded information in a separate channel corresponding to a logical channel not equal to 0 in accordance with the ITU-H.223 standard.

8. The method according to claim 7, wherein:

the object descriptors each corresponds to an Initial Object Descriptor in accordance with MPEG-4.

9. The method according to claim 3, further comprising the steps of:

for object-based audiovisual, encoded information having a large number of objects, multiplexing the separate data streams into a common data stream; and transmitting the separate data streams in one of the individual transmission channels.

10. The method according to claim 9, wherein:

the one of the individual transmission channels includes an ITU channel.

11. The method according to claim 1, wherein:

the multiplexed separate data streams are in a transmission frame of the predefined frame-structured transmission standard, and the method further comprises the step of:

in addition to the multiplexed separate data streams in the transmission frame of the predefined frame-structured transmission standard, storing a signaling information that signals that multiplexed information packets of a constant length are transmitted, on whose basis a synchronization can be carried out.

12. The method according to claim 11, wherein:

the synchronization is in response to faulty data packets.

13. The method according to claim 1, further comprising the step of:

accommodating in an additional channel object descriptors.

14. The method according to claim 13, wherein:

the additional channel includes logical channel 0 corresponding to the ITU H.245 standard.

15. The method according to claim 13, wherein:

the object descriptors each corresponds to an Initial Object Descriptor in accordance with MPEG-4 for the audiovisual encoded information.

16. The method according to claim 13, further comprising the step of:

storing allocation data between the separate data streams in the additional channel.

17. The method according to claim 16, wherein:

the separate data streams include SL-packetized MPEG-4 elementary data streams and multiplexed data.

18. The method according to claim 16, wherein:

the additional channel includes logical channel 0 in accordance with the ITU-H.245 standard.

19. The method according to claim 1, further comprising the step of:

for a signaling information, providing data fields that identify, on the one hand, a constant length and, on the other hand, a packet size of multiplexed information packets.

20. The method according to claim 1, wherein:

MPEG-4 data corresponds to the audiovisual encoded information that are preprocessed into FlexMux packets of a constant length, and the FlexMux packets of the constant length are multiplexed into a transmission frame in order to make possible a transmission in accordance with the ITU standard H.324.

21. The method according to claim 1, further comprising the steps of:

within an Adaptation Layer of a variable length in accordance with the ITU standard H.324, storing a plurality of MPEG-4 data in data packets of a constant length; and providing a length field in a header portion of each of the data packets, wherein:

the length field corresponds to a synchronization identification.

22. The method according to claim 21, wherein:

the synchronization identification is for synchronizing a receiver.

23. A terminal for a transmitter-side integrating of audiovisual encoded information into a predefined frame-structured transmission standard, comprising:

an arrangement for preprocessing the audiovisual encoded information into separate data streams for the terminal;

an arrangement for delivering the audiovisual encoded information as the separate data streams;

an arrangement for multiplexing the separate data streams into at least one data channel of the predefined frame-structured transmission standard;

an arrangement for exchanging capabilities with other terminals as to types of data capable of being one of encoded and decoded and as to encoding and decoding operations that are supported, after a connection is established; and an arrangement for signaling, in accordance with data structures, specifications on the data type used, a decoding tool to be used, and encoding parameters including a data capacity.

24. A terminal for a receiver-side evaluation of audiovisual encoded information in a predefined frame-structured transmission standard, comprising:

an arrangement for decomposing up at least one multiplexed frame-structured data channel of a transmission standard into individual audiovisual data streams;

an arrangement for exchanging capabilities with other terminals as to types of data capable of being one of encoded and decoded and as to encoding and decoding operations that are supported, after a connection is established; and an arrangement for signaling, in accordance with data structures, specifications on the data type used, a decoding tool to be used, and a data capacity.

* * * * *

UNITED STATES PATENT AND TRADEMARK OFFICE
CERTIFICATE OF CORRECTION

| | | |
|---|---|---|
| PATENT NO. | : 6,907,067 B1 | Page 1 of 1 |
| APPLICATION NO. | : 09/786574 | |
| DATED | : June 14, 2005 | |
| INVENTOR(S) | : Henning Moeller et al. | |

It is certified that error appears in the above-identified patent and that said Letters Patent is hereby corrected as shown below:

Column 1, line 49, change "according to G. 723. 1," to --according to G. 723. 1.--

Column 3, line 4, change "into the flu" to --into the ITU--

Column 4, lines 41-42, change "only contains the Initial Object Descriptor or the" to --only contains the Initial Object Descriptor or the--

Column 5, line 30, change "These MPEG-4specific data" to -- These MPEG-4-specific data--

Column 8, line 14, change "into separate data streams" to --as the separate data streams--

Signed and Sealed this

Eighth Day of August, 2006

JON W. DUDAS
*Director of the United States Patent and Trademark Office*